Sept. 4, 1928. Re. 17,077
L. M. POUGET
APPARATUS FOR USE IN MAKING EXTRACTS, INFUSIONS, DECOCTIONS, AND THE LIKE
Original Filed June 30, 1923
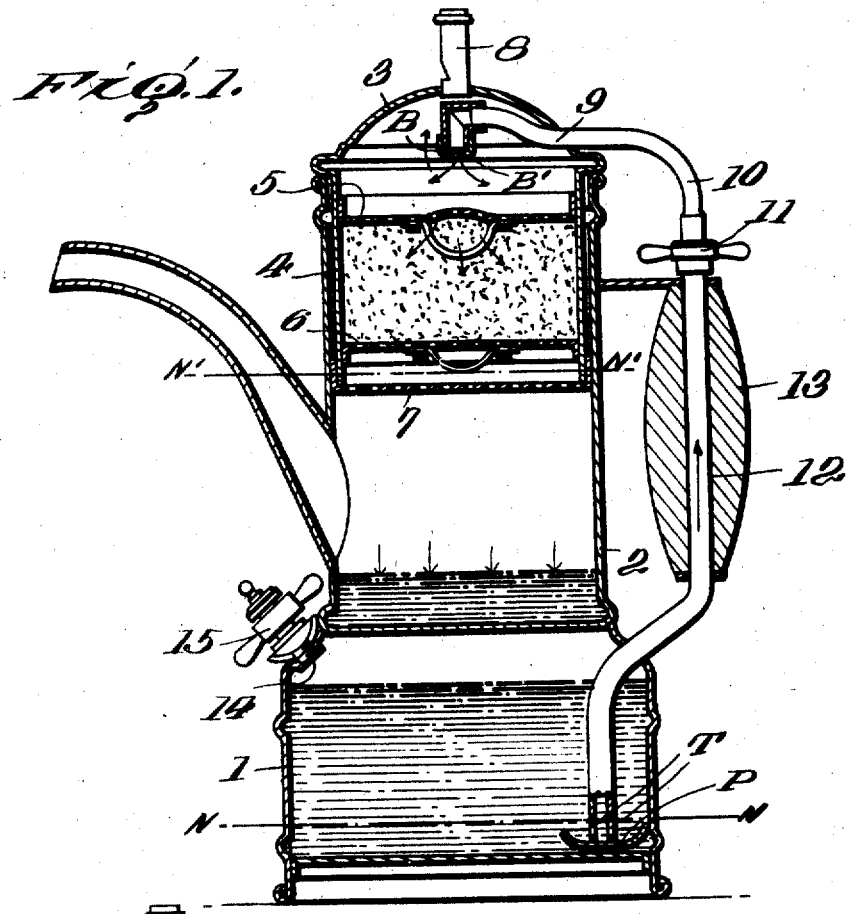
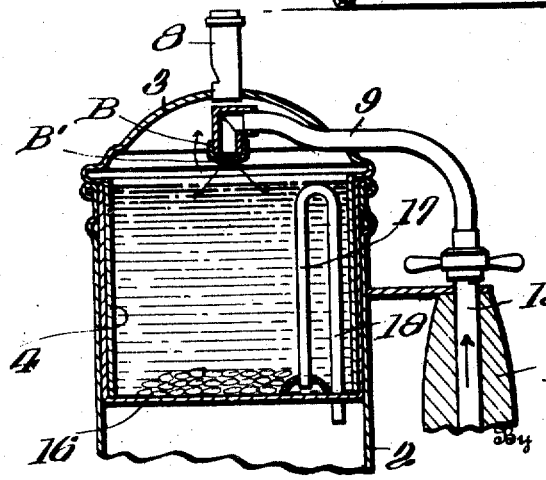
Fig. 2.
Inventor
Louis Marcel Pouget
By
Sturtevant & Mason
Attorneys Reissued Sept. 4, 1928.

Re. 17,077

UNITED STATES PATENT OFFICE.

LOUIS MARCEL POUGET, OF VALLIERES, FRANCE.

APPARATUS FOR USE IN MAKING EXTRACTS, INFUSIONS, DECOCTIONS, AND THE LIKE.

Original No. 1,556,026, dated October 6, 1925, Serial No. 648,756, filed June 30, 1923, and in France November 22, 1922. Application for reissue filed October 7, 1927. Serial No. 224,708.

The invention relates to apparatus for automatic infusion of coffee, tea or any other material and its object is to provide an apparatus permitting the production of any such infusion in very efficient manner, means being provided to indicate when the infusion is complete.

In order to attain this object, I provide a cafetière or the like comprising a boiler and a filter in which the water intended to effect the infusion with the ground coffee or the like is caused to move in accordance with thermosiphonic action. The boiling water is thus raised by thermosiphonic action and flows onto the ground coffee contained in the upper part of a filter receptacle or onto the other material to be infused. After the necessary quantity of water has been delivered, the residual water still contained in the boiler produces steam which is utilized to actuate a whistle which gives a warning that the infusion is complete.

In order that the invention may be clearly understood, reference is made to the accompanying drawings, which show a construction of apparatus in accordance with the present invention.

Figure 1 is a vertical section of an arrangement of apparatus in accordance with the present invention.

Figure 2 is a secondary detail which is used to replace the filter for use in making infusions of tea and other material.

Referring to Fig. 1, which shows the apparatus for use in making an infusion of coffee, tea or the like, the base of the apparatus comprises a receptacle or boiler 1 which contains water and which is completely closed and above which is superposed an extended receptacle 2 to contain the infused coffee.

A cover 3 is provided on the top of the receptacle 2 and the said cover is extended to form an interior box or casing 4 for use in filtering the coffee when the perforated plates 5, 6 and 7 have been placed in position.

The cover 3 is provided with a whistle 8 and a water inlet 9 having an outlet nozzle B and a small opening therefrom B′ which controls the supply of water to the receptacle 2. The water inlet 9 is connected to a tube 10, the latter being connected by a coupling 11 to a tube 12 which extends downwards and into the receptacle 1 and nearly to the bottom thereof. The tube 12 is provided with a bracket 13ᵃ and a handle 13 by which the apparatus may be manipulated.

The tube 12 has for its object to conduct the boiling water from the receptacle 11 under the pressure of the vapor generated in and existing at the top of this receptacle so that the said water when boiling ascends the tube 12, tube 10, tube 9 and escapes through the outlet opening B′ onto the ground coffee contained in the upper filtering receptacle 4. A cup P is fixed at the lower end of the tube 12 which is closed to the receptacle except for the open-T within the cup P so as to prevent the escape of steam into the tube 12 before the necessary quantity of liquid has been used; that is to say, before all the water contained above the level N—N has been used.

The filtering receptacle, as will be readily seen, must be separated from the body of the apparatus when it is desired to clean said receptacle or to introduce a new supply of ground coffee or other desired material. The replenishing of the receptacle is effected by removing the cover and holding it in a reverse position with the perforated plate 5 in place, the said plate serving as an abutment to the ground coffee. When the latter has been placed on the perforated plate 5, it is compressed by the plate 6. The lower end of the filtering receptacle 4 is provided with a perforated plate 7 which acts as a plug or cap in order to retain the ground coffee in position, in case the plate 6 drops when the filtering receptacle is placed in the apparatus. The plate 7 may be provided with a suitable filtering sheet so as to effect perfect filtration.

When coffee is to be infused, the parts of the apparatus are in the position shown in the drawing, the filtering device being in its proper place and the tube 10 connected by the coupling 11 to the tube 12, which as previously stated extends into the water receptacle 1 into which the requisite quantity of water can be introduced through the stoppered opening 14. The stopper for the opening 14 comprises a screw down plug 15 which is provided with a safety valve.

It is sufficient then to place the receptacle on the fire without any other precaution, the infusion being effected automatically as soon as the water reaches the boiling point. As soon as this infusion is completed, warning thereof will be given by the whistle 8, thus indicating that the infusion operation is complete.

The action of the apparatus is as follows: The water in the receptacle 1, on being heated, rises in the tube 12 as in the thermo-siphon. As this heat gradually increases the steam which is formed at the surface increases in pressure above the level of the water and the water rises further in the tube 12 and diffuses slowly through the nozzle B and the outlet B′ therein onto the ground coffee which swells. When boiling takes place and the pressure increases, the boiling water passes through the tube 12, tube 10, tube 9 and is sprayed onto the coffee, the liquid passing successively through the plates 5, 6 and 7 and falling into the receptacle 2 in which there is a high temperature during the infusion period.

When the water from the receptacle 1 falls to the level N—N, the supply of water to the filtering receptacle is stopped because the openings in the tube 12 are no longer under the level of the water. The infused coffee reaches the level N′—N′ for example and the infusion is then terminated. But as the apparatus remains on the fire or on the heating device until infusion is complete, there is sufficient residual water in the receptacle to prevent burning. It is essential however, that the action of the fire on this small volume of water should be stopped as soon as possible. With this object in view and as infusion is complete, the steam which is formed in the receptacle 1 passes into the tube 12 and is delivered to the upper part of the filtering receptacle 4. But here the layer of coffee and water is opposed to the escape of the steam and it is therefore compelled to escape through the whistle 8, thus giving a warning that the infusion operation is complete. It may be remarked that the level of the infusion in the receptacle 2 extends above the perforated plate 7 and that it forms a hydraulic seal which opposes any passage of the steam through the layer of coffee.

The apparatus may be used for the infusion of tea or other desired material, its action being practically the same in all cases.

For this purpose it will be sufficient to remove the three perforated plates 5, 6 and 7 and to substitute therefor a receptacle 16 such as is shown in Fig. 2. The receptacle 16 is introduced into the filtering receptacle 4. It is provided interiorly with a siphon fixed to the bottom thereof. The siphon has one of its limbs 17 in communication with the interior of the receptacle 4, the other limb 18 passing through the bottom of the receptacle 16 and into the receptacle 2, although not necessarily extending to the bottom of said receptacle. This siphonic action is used although in this form the liquid cannot escape immediately from the receptacle 4 but must remain for the infusion of the tea. It is understood therefore that tea or other material is placed in the receptacle 16 and that boiling water is admitted by the tube 9 and remains in the receptacle.

As the water gradually rises in this receptacle it falls through the limb 17 of the siphon and on reaching the bend of the siphon it flows through the limb 18 into the receptacle 2 of the apparatus.

Infusion is effected during the period of delivery of liquid through the tube 9 and the nozzle B and outlet B′ therefrom. When this escape stops, the steam acts on the whistle as previously described and the liquid contents of the receptacle 4 continue to flow through the siphon and finally are completely discharged therefrom into the receptacle 2. Here, as in the cafetière construction, infusion is effected during all the period of delivery which gives a beverage with all the qualities of the material retained therein.

The apparatus described for the infusion of coffee and tea may be used for the infusion of any other material and it is not limited in its dimensions nor in its details nor in the material employed.

What I claim is:

1. A boiler, a receptacle detachably mounted therein, a filtering receptacle in the first named receptacle and having a cover which also forms the cover of said first named receptacle, a tube comprising two members, one leading from the bottom of the boiler and the other leading from the first to the upper portion of the filtering receptacle and including a portion arranged without the boiler and first named receptacle and also including a coupling joint, the said members being respectively attached to the boiler and to the first named receptacle and a handle having a bore through which that portion of the first named tubular member which is arranged with the boiler extends.

2. In an infusing apparatus, a boiler, an infusion receiving receptacle connected to the boiler, a cover for said receptacle having a skirt extending downwardly into the same, perforated plates securable in said skirt therewith to support and contain the material to be infused, a liquid delivery tube secured to said cover and communicating with the interior thereof above said plates, a second tube communicating with said boiler adjacent its bottom and extending upwardly outside said boiler and receptacle and a coupling joint to connect said tubes whereby they may be separated to permit separation of said cover from said receptacle, one of said tubes constituting a handle for the apparatus.

3. In an infusing apparatus, a boiler having upwardly extended walls with a partition therein to separate a closed lower boiler for the infusing liquid and an upper infusion receiving receptacle, a cover for said receptacle having a downwardly extended skirt to enter said receptacle, perforated plates securable in said skirt therewith to support and contain the material to be infused, a tube communicating at one end with said boiler at a predetermined minimum liquid level therein and communicating at the other end with the space in said cover above the said plates and a whistle mounted on said cover, whereby a vapor pressure in the boiler will cause the liquid to rise in said tube and flow downward from the upper end thereof through the said plates and material so as to produce the infusion and then to collect in said receptacle, and whereby the vapor in said boiler will actuate said whistle when a predetermined minimum level is attained in said boiler, such vapor being prevented by the material and the infusing liquid from passing into said receptacle.

4. In an infusing apparatus, a boiler for the infusing liquid, an infusion receiving receptacle connected to the boiler, a cover for said receptacle having a skirt extending downwardly into the same, perforated plates securable in said skirt therewith to support and compress the material to be infused in a layer of uniform thickness, the upper of said plates forming a closed chamber with said cover at the upper end thereof, a whistle mounted on said cover and operated by vapor escaping from said chamber, and means to bring heated infusing liquid from said boiler into said chamber to flow through said plates and material and establish a liquid level in said receptacle sealing said cover, and thereafter to bring vapor from said boiler to said chamber whereby to actuate the whistle.

5. In an infusing apparatus, a boiler, an infusion receiving receptacle connected to said boiler, a cover for said receptacle having a skirt extending downwardly into the same, perforated plates in said skirt adapted therewith to support and contain the material to be infused, a liquid delivery duct extending from the lower part of said boiler and open to the interior of the said cover above the perforated plates, and a cup mounted in said boiler at the bottom thereof and about the lower end of said duct, said duct opening to said boiler within said cup.

6. In an infusing apparatus, a boiler, an infusion receiving receptacle at a higher level than said boiler, a cover for said receptacle, a conduit to connect said boiler with said cover, said conduit opening into said boiler above its bottom, means to support material to be infused beneath the point of communication of said conduit with said cover, so that hot water from said boiler is delivered onto said material to trickle therethrough and collect as infusion in said receptacle, and a whistle mounted on said cover to be actuated by steam passing through said conduit.

7. In an infusing apparatus, a boiler, an infusion receiving receptacle at a higher level than said boiler, a cover for said receptacle, a conduit to connect said boiler with said cover, means to support material to be infused beneath the point of communication of said conduit with said cover, a discharge spout for said receptacle, the conduit delivering hot water onto said material to trickle therethrough and collect as infusion in said receptacle whereby to establish a level therein above the opening of said spout, and a whistle on said cover adapted to be actuated by steam after the infusion has closed the spout opening.

8. In an infusing apparatus, a boiler, an infusion receiving receptacle mounted above said boiler, a material-containing perforated member mounted on said receptacle, a liquid delivery duct extending from the lower part of said boiler and opening above said member, a cover closing said member, a whistle in said cover, and a cup mounted in said boiler and surrounding the lower end of said duct.

LOUIS MARCEL POUGET.